United States Patent
Brown, Jr.

(10) Patent No.: US 9,653,117 B2
(45) Date of Patent: May 16, 2017

(54) INTERCONNECTED MULTIMEDIA SYSTEMS WITH SYNCHRONIZED PLAYBACK OF MEDIA STREAMS

(71) Applicant: AVID TECHNOLOGY, INC., Burlington, MA (US)

(72) Inventor: Robert M. Brown, Jr., Sunnyvale, CA (US)

(73) Assignee: Avid Technology, Inc., Burlington, MA (US)

( * ) Notice: Subject to any disclaimer, the term of this patent is extended or adjusted under 35 U.S.C. 154(b) by 604 days.

(21) Appl. No.: 14/013,384

(22) Filed: Aug. 29, 2013

(65) Prior Publication Data

US 2015/0063774 A1 Mar. 5, 2015

(51) Int. Cl.
| | |
|---|---|
| H04N 5/93 | (2006.01) |
| G11B 27/19 | (2006.01) |
| G11B 27/10 | (2006.01) |
| G11B 27/30 | (2006.01) |
| H04N 5/76 | (2006.01) |
| H04N 21/43 | (2011.01) |
| H04N 21/462 | (2011.01) |

(52) U.S. Cl.
CPC ............ *G11B 27/19* (2013.01); *G11B 27/10* (2013.01); *G11B 27/3045* (2013.01); *H04N 5/76* (2013.01); *H04N 21/4307* (2013.01); *H04N 21/4622* (2013.01)

(58) Field of Classification Search
None
See application file for complete search history.

(56) References Cited

U.S. PATENT DOCUMENTS

| | | | |
|---|---|---|---|
| 6,134,379 A | 10/2000 | LaMacchia | |
| 6,393,198 B1 | 5/2002 | LaMacchia | |
| 6,789,105 B2* | 9/2004 | Ludwig | G06Q 10/10 709/204 |
| 8,224,147 B2 | 7/2012 | Wilcox et al. | |
| 2006/0002681 A1* | 1/2006 | Spilo | H04N 5/76 386/220 |
| 2007/0280638 A1* | 12/2007 | Aoki | H04N 5/765 386/231 |

(Continued)

OTHER PUBLICATIONS

Source-Connect Pro 3.1 User Guide, Source-Elements, 2009, 68 pages.

*Primary Examiner* — Heather Jones
(74) *Attorney, Agent, or Firm* — Oliver Strimpel

(57) ABSTRACT

Synchronous playback of time-based media received from one or more locations remote from a primary editing/mixing studio is achieved by time-stamping media samples with a local presentation time before streaming them to the primary studio. At the primary studio, samples having the same presentation timestamp are played back at the same time, independently of the samples' arrival time at the playback system. Media stored locally to the playback system may also be included as part of the synchronous playback using locally computed presentation times. In order to accommodate media streaming transmission delays, the playback system negotiates a suitable delay with the remote systems such that samples corresponding to a given presentation time are received at the playback system from remote locations prior to playback of media corresponding to the given presentation time.

16 Claims, 2 Drawing Sheets

(56) References Cited

U.S. PATENT DOCUMENTS

2010/0260468 A1* 10/2010 Khatib .............. G06F 11/0757
386/278
2011/0026899 A1* 2/2011 Lussier .............. G11B 27/034
386/281

* cited by examiner

INTERCONNECTED MULTIMEDIA SYSTEMS WITH SYNCHRONIZED PLAYBACK OF MEDIA STREAMS

BACKGROUND

The various components that make up a video composition are often captured and edited in different locations. In video production, for example, each of the video, music, sound effects, dialog, and computer-generated imagery may be produced in a different place. In order to review and evaluate the various program components, it is necessary to assemble as many of the components together as possible for viewing. Furthermore, it is important to be able to conduct frequent reviews of work in progress. Current methods involve transport of physical storage media, such as hard drives, file transfer, or the use of shared storage locations maintained in remote servers. In other cases, media is transmitted from remote locations and playback of the transmitted media and local media requires synchronizing the starting playback times of the remotely located components. Most players play the incoming media as it is received while taking into account a fixed delay introduced in transit. If the estimated delay is not long enough to transfer data prior to playback, drop-outs may occur during playback.

Other methods of playback involve special purpose devices that emit clock signals or other special codes to enable devices to synchronize playback, as described, for example, in U.S. Pat. Nos. 6,134,379 and 6,393,198, which are hereby incorporated by reference. Once started, the remote sources of transmitted media continue to run freely, with the risk that as playback proceeds, synchronization will become progressively less precise, and eventually be lost entirely. Other methods involve ensuring that system clocks of each of the participating systems are synchronized, such as by receiving a real-world clock signal or a house reference clock signal.

A practical, timely, accurate method of synchronized playback of the multiple components that comprise a media composition is needed.

SUMMARY

In general, the methods, systems, and computer program products described herein provide synchronized playback of the multiple components of a media composition, including media streamed from remote systems and media stored locally to the system performing synchronized playback.

In general, in one aspect, a method of synchronized playback of time-based media comprises: establishing a data connection between a first system for playing back time-based media and a second system for playing back time-based media; designating the second system for synchronized media playback; at the second system: receiving via the data connection from the first system a stream of time-based media comprising a first plurality of samples representing a first time-based media track, wherein each sample of the first plurality of media samples is time-stamped with a presentation time defined as a temporal offset from a predetermined playback start time on the first system; retrieving from storage on the second system a second time-based media track comprising a second plurality of samples, wherein each sample of the second plurality of samples is time-stamped with a presentation time defined as a temporal offset from a predetermined playback start time on the media editing system; and playing back the first media track in synchrony with the second media track by playing the first plurality of samples and the second plurality of samples such that samples having the same presentation time are played simultaneously.

Various embodiments include one or more of the following features. The method for synchronized playback further includes estimating a data transmission delay over the data connection, and the synchronized playback is delayed with respect to playback on the first system by an interval of at least the estimated data transmission delay. A user of the first system initiates the synchronized playback, and the first playback system estimates the data transmission delay. A user of the second system initiates the synchronized playback, and the first system estimates the data transmission delay. At least one of the first and second systems includes time-based media editing capability. The playing back step is performed with a delay such that samples from the first system corresponding to a given presentation time have been received at the second system prior to playback at the second system of media corresponding to the given presentation time. Synchronized playback further includes: at the second system, receiving via a second data connection from a third system for playing back time-based media a third plurality of samples representing a third time-based media track, wherein each sample of the third plurality of media samples is time-stamped with a presentation time defined as a temporal offset from a predetermined playback start time on the third system; playing back the third time-based media track in synchrony with the first and second time-based media tracks by playing the third plurality of samples such that samples of the third plurality of samples having the same presentation time as presentation times of the first and second plurality of samples are played simultaneously. Playback at the second system is performed with a delay such that samples from the first and third systems corresponding to a given presentation time have been received at the second system prior to playback at the second system of media samples corresponding to the given presentation time. Synchronized playback involves: estimating a first data transmission delay over the first-mentioned data connection; estimating a second data transmission delay over the second data connection; starting playback on each of the first and third systems in advance of starting playback on the second system such that media samples from the first and third systems are received by the second system prior to being required for playback at the second system. The second system includes a non-linear video editing system. At least one of the first and third systems includes a digital audio workstation or a non-linear video editing system. Synchronized playback on the second system is initiated by a user of the first system. Estimation of the first-mentioned and second data transmission delays is performed by the first system. Synchronized playback on the second system is initiated by a user of second system and the second system performs the estimation of the first-mentioned and second data transmission delays.

In general, in a second aspect, a system comprises: a memory for storing computer-readable instructions; and a processor connected to the memory, wherein the processor, when executing the computer-readable instructions, causes the system to perform a method of synchronized playback, the method comprising: establishing a data connection between a first system for playing back time-based media and a second system for playing back time-based media; designating the second system for synchronized media playback; at the second system: receiving via the data connection from the first system a stream of time-based media comprising a first plurality of samples representing a first time-based media track, wherein each sample of the first plurality of media samples is time-stamped with a presentation time defined as a temporal offset from a predetermined playback start time on the first system; retrieving from storage on the second system a second time-based media track comprising a second plurality of samples, wherein each sample of the second plurality of samples is time-stamped with a presentation time defined as a temporal offset from a predetermined playback start time on the media editing system; and playing back the first media track in synchrony with the second media track by playing the first plurality of samples and the second plurality of samples such that samples having the same presentation time are played simultaneously.

DETAILED DESCRIPTION

Figure 1:
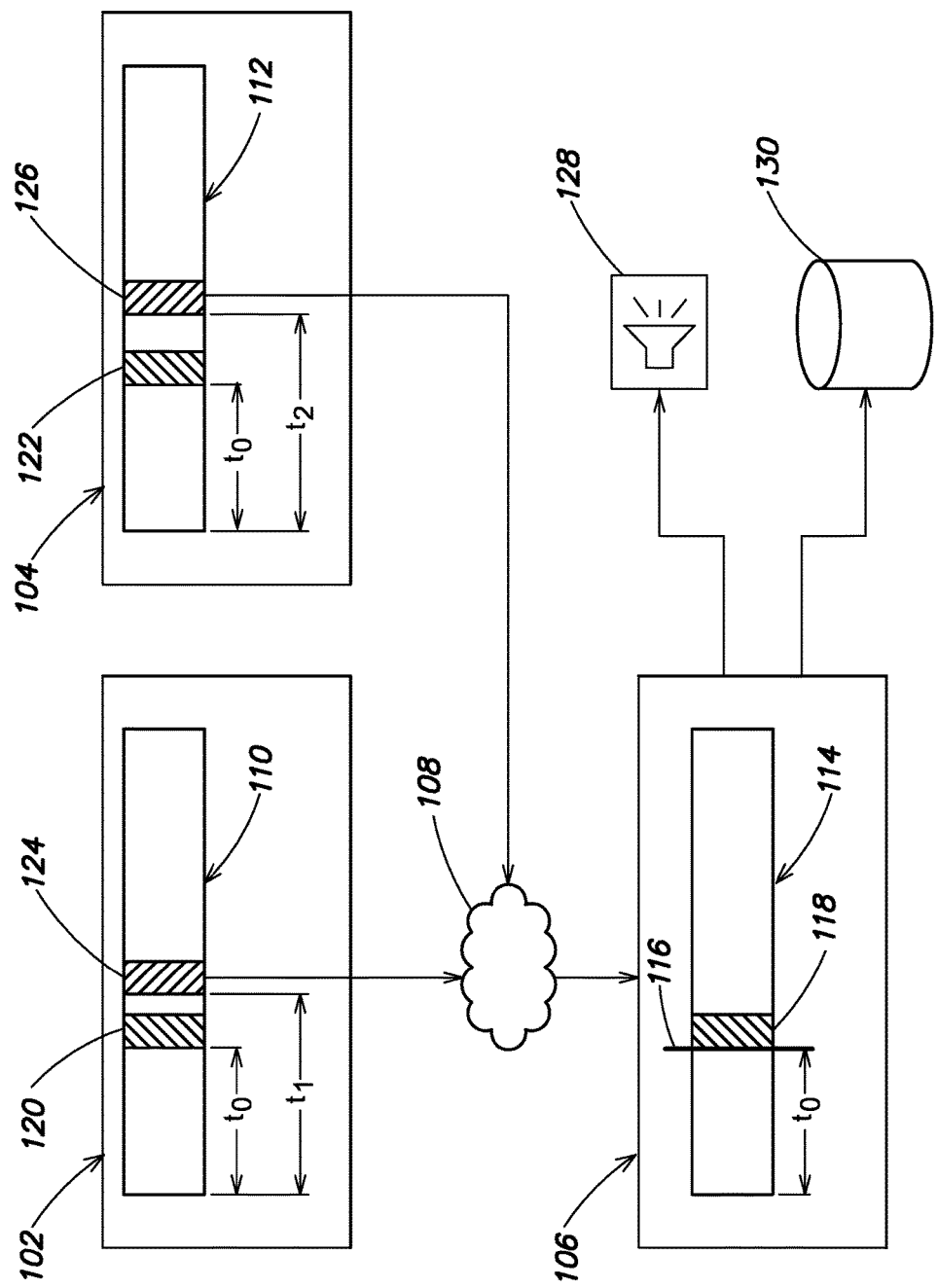
FIG. 1 is a high level block diagram illustrating synchronized playback of streamed media.

Any media project of significant size involves collaboration among various contributing groups. For example, video may be generated and stored by a video team in a first location, music by a composer in a second location, sound effects by an audio effects group in a third location, and computer-generated imagery by a computer graphics group in a fourth location. A key aspect of the workflow for such projects is frequent review and approval by a senior editor or the director. Effective evaluation of a work in progress is greatly assisted when the various components of the project can be viewed together. It is also crucial that the process be undertaken rapidly, so as to provide timely feedback to production teams, which facilitates staying on schedule and project cost control.

As discussed above, existing methods of assembling and viewing the various components of a media project in progress tend to be unsatisfactory, either because of slow turnaround caused by transport delays, or because of difficulty maintaining accurate synchronization during playback. We describe herein a sample-accurate method of synchronizing the playback of media, including media originating from remotely located multimedia systems and media that is retrieved from storage or a live source local to the site of synchronized playback.

As used herein, a multimedia system refers to a system for playing time-based digital media, i.e., video and/or audio. The systems may in addition have editing capability. For systems that include digital audio editing capability, a multimedia system may include a digital audio workstation (DAW), such as PRO TOOLS® from Avid Technology, Inc. of Burlington, Mass. As used herein, a DAW refers to an audio application implemented on a computer, such as a personal computer, mobile device, touch pad, or other device that includes a CPU, memory, display, and input devices. DAW functionality includes, but it not limited to the ability to record and play back more than one track of audio and mix the channels together. A DAW may be implemented on a dedicated device connected to a control surface that mediates the user interface. DAWs may also include nonlinear editing functionality, a user interface displaying a timeline that provides a temporal representation of an audio clip, and the ability to cause audio processing to be performed on an audio signal. Such processing may be performed either by the same platform that hosts the DAW, or another system such as an audio processing engine that may be provisioned with digital signal processors (DSPs).

For media systems that include digital video editing capability, a multimedia system may include a non-linear video editor (NLE), such as MEDIA COMPOSER®, also from Avid Technology, Inc. NLE functionality includes, but is not limited to the ability to record and play back one or more video tracks, place video clips into a timeline representing a video composition, and edit clips and other elements in the timeline.

As used herein, the term "sample" refers to the smallest constituent unit of a media track, media document, or media file that has a distinct temporal location within the media track, document or file. For video media, a media sample corresponds to a video frame. For audio media, a media sample is a single sample of audio. As used herein, a track is a representation of a container for the various elements of source media that an editor places into a timeline of a media editing system. In the context of non-linear video editing applications and digital audio workstations, a track is a software representation that forms part of the graphical user interface. A track may have a media stream input and/or a media stream output.

The synchronization method involves synchronizing the start times for multiple interconnected playback engines on the various interconnected systems such that a playback command received on one system causes the connected engines to start playback at a given temporal location as defined by each system's local timeline. Such start-time synchronization is described in U.S. Pat. No. 8,224,147, which is incorporated herein in its entirety, and which describes the Video Satellite™ master-slave architecture. In the Video Satellite system, synchronization is maintained via frame edges using special purpose synchronization hardware together with an external reference signal received at each playback engine from a video reference generator.

Time-line synchronized playback depends on being able to buffer incoming media until it is required for playback. For example, if three media sources are to be played back in synchrony, with one source originating locally, and each of the other two streams originating from a different remote location, then the combined media can only be played back when the most delayed stream is received at the system designated for synchronized playback. Thus the amount of data to be buffered should at least correspond to the amount of data that is streamed between the earliest-received samples for a given timestamp, and the last-received, i.e., the most delayed samples for that timestamp. In practice, it is expected that such time-differences would be in the range of 250-500 milliseconds, corresponding to 11,025-22,050 samples for a 44.1 kHz stream.

A mechanism is provided to enable a synchronized playback command to be input at any of the interconnected multimedia systems, regardless of which station is actually designated to perform the synchronized playback. When a playback command is received, a delay negotiation process occurs between the connected systems in order to estimate the required delay referred to above. This delay is used to ensure that all the systems start playing at a time that allows for streamed media from all locations to be received and ready at the designated playback system when required for synchronized playback. In the described embodiment, the system that is streaming the media measures average and maximum latencies for delivery of media packets to the receiving system using one or more of several well-known methods, such as determining the round trip time for a message to travel from the sending system to the receiving system and back. In one method, the system sending the media stream adds an additional timestamp to the media stream buffer. This timestamp uses a network clock, i.e., a shared free-running clock. When a system receives a media stream buffer, either after a one-way transmission or a round trip transmission, it reads the network clock, and uses the difference between current time and the network clock timestamp within the media stream buffer to determine the travel time of the media.

The measured delay is communicated to the system designated for playback. For a single pair of connected systems (i.e., a single remote system connected to the designated playback system), this delay is then used by the designated playback system during synchronized playback. In a configuration in which two or more media playback systems are connected remotely to the system designated for synchronized playback, the delays between each remote system and the playback system are measured. In the described embodiment, the system at which the playback command is received requests that each of the delays be measured, and then determines the play start times for each system to ensure timely arrival of streamed media at the designated playback system.

In some networks, the bandwidth available for streaming may vary erratically. In such circumstances, an automatically determined delay may not be long enough to ensure that streamed media always arrives in time for synchronized playback. In such circumstances, dropouts in the playback occur when media arrives too late. To address this problem, the user may define a minimum delay that exceeds the likely variation in actual media streaming delays.

In the case that synchronized playback is started via a user command at a media sending system, the sending system determines the delay between it and the playback system, and uses this delay to determine when it should start playing. Unless additional latency is required for some reason, or a larger user-defined delay has been specified, the sending system starts playing prior to the designated playback system by a time interval corresponding to the measured delay. The sending system sends the designated playback system a signal that informs it when to start synchronized playback.

In the case that synchronized playback is started via a user command at the designated playback (i.e., receiving) system, the designated playback system determines the delay between it and each of the remote systems, computes the play start times for each remote system, and sends a trigger message to each remote system to start streaming in advance by a time interval corresponding to the measured delay. Thus the remote system with the largest measured delay starts streaming first, followed by the system with the next longest delay, and so on, with the designated playback system itself commencing synchronized playback last of all.

Synchronized playback of streamed media is illustrated in the high level block diagram shown in FIG. 1. Three multimedia systems 102, 104, and 106 are in data communication via network 108, which may be a local area network or a wide-area network such as the Internet. Locally stored media are represented in each multimedia system by timelines 110, 112, and 114 respectively. Multimedia system 106 is designated as the system where the media is to be assembled and played back.

Figure 2:
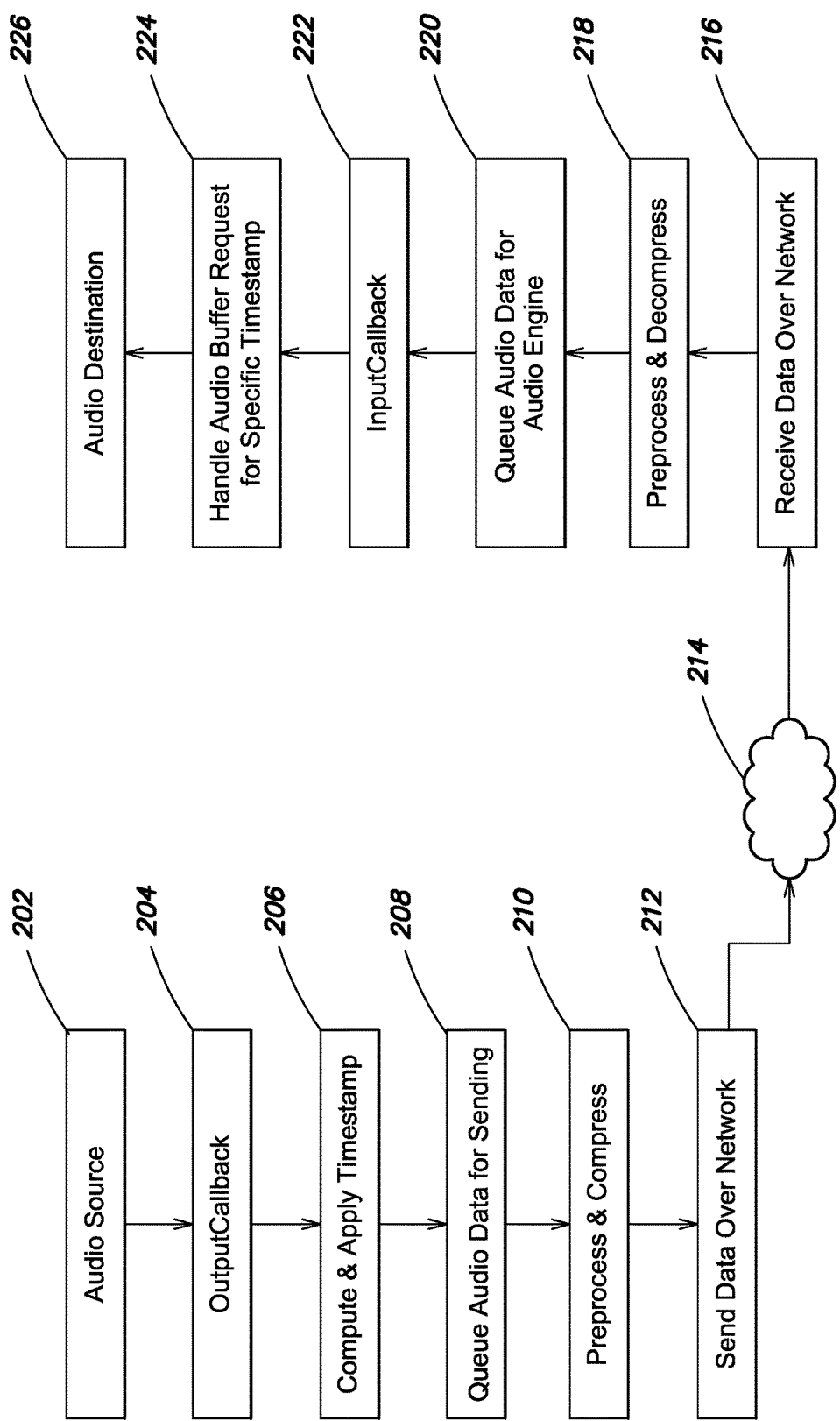
FIG. 2 is a flow diagram illustrating steps involved in streaming media for synchronized playback.

When playback is initiated, remote systems 102 and 104 stream samples to designated playback system 106. FIG. 2 is a flow diagram illustrating steps involved in the streaming. A connected remote playback system which is to provide streamed media for synchronized playback (i.e., a sending system) includes audio source 202, which may be stored audio data and/or live data from a source such as a microphone. A command 204 (OutputCallback) is issued by the sending system's playback engine. This causes the sending system to time-stamp each sample of the streamed media with temporal data defining the temporal position of the sample with respect to the timeline of the media engine from which the media is being streamed (206). The timestamp is referred to as a presentation timestamp. In the described embodiment, when a request for media data is received, the offset of the requested media from the playback start location together with information on the location where playback commenced is used to compute the presentation timestamp for the data to be sent. The timestamp may be a value in microseconds represented by a 64-bit signed integer that is included in the each media packet, preferably within the packet's payload, before it is queued for sending (208), optionally preprocessed, e.g., compressed, (210) and then streamed (212) to the designated playback (receiving) system via wide area network 214.

The designated playback system receives the streamed data (216), performs any required preprocessing, e.g., decompression (218), and when data is required for playback, provides an empty buffer into which received streamed data is copied. The received data includes the media itself, as well as presentation timestamps for each media sample. The streamed media is queued for the audio playback engine (220). When an InputCallback command occurs (222), the system handles the audio buffer's request for audio data with the required timestamp (224) by searching the incoming buffer queue for the requested buffer from the queue, and if found, removing it from the buffer queue and injecting it into the playback engine at the proper time to play back received media streams in synchrony with locally originated media. The playback engine drives the rate at which the InputCallback occurs, which is a constant rate based on the engine's buffer size. Sample-accurate, synchronous playback is achieved by playing streamed samples and local samples such that all samples having the same presentation timestamps (each defined with respect to their respective source timelines) are played back simultaneously. This ensures that playback remains synchronized with respect to timeline defined temporal locations, and is not affected by transmission delays or the effects of varying available bandwidth. Furthermore, there is no scope for timing errors to accumulate, as for example, in the case when local clocks are used to synchronize playback of remotely streamed media. The audio output of the synchronized media streaming is then sent to audio destination 226, which may be a live sound output device, such as amplifier and speaker, or a recording device.

FIG. 1 shows playback occurring at presentation time $t_0$, i.e., the play head (or scrub bar) 116 of designated playback system 106 is at time=$t_0$. At this time, system 106 plays back local sample 118, and also injects into the playback engine previously received and buffered samples 120 and 122 from connected multimedia systems 102 and 104 respectively, each having timestamp $t_0$ with respect to their source timelines. The figure also illustrates how, while playback system 106 is playing back in synchrony the three samples corresponding to a timestamp of $t_0$, system 102 is streaming sample 124 corresponding to timestamp $t_1$ and system 104 is streaming sample 126 corresponding to time $t_2$. The interval between times $t_1$ and time $t_0$ and times $t_2$ and $t_0$ are selected to be equal to or exceed the known transmission delays between each of systems 102 and 104 respectively and playback system 106. These samples will be played out when the playback head of system 106 reaches presentation times $t_1$ and $t_2$ respectively.

The output of the synchronized playback from multimedia system 106 is directed to loudspeaker 128 and/or to storage 130 for recording or archiving.

Synchronized streaming as described herein may be used in a variety of production settings. During talent capture, the talent may be in one location where audio and/or video is captured. The primary recording studio may be in another location, where an engineer, producer, and director are located, and where synchronized playback occurs using a media editing system, such as a digital audio workstation. The primary studio sends backing audio tracks and/or video to the talent to use as the basis for his/her performance. The talent then performs while listening to and/or watching these tracks and the performance is streamed in real time using the methods described above to the primary studio where it played back in synchrony with locally stored media.

In a remote mixing application, two or more studios are remotely located from a primary studio where the final mix is to be produced. The sources from the remote studios are streamed to the primary studio, where local media and remotely streamed media are played back in synchrony as described herein and mixed. In a typical mix/dub stage, there are three source systems: music, effects, and dialog that are streamed and played back in synchrony.

Synchronized media streaming may also be used during the review and approval phase of a media production workflow. For example, a producer or director who is remotely located from the main mix or dubbing stage may need to review the current state of the production, or perhaps just review a particular aspect that has been edited. The director or producer receives the edited component, and is able to synchronize it with previously received and still current components and play it back. In a common situation, the finalized video and original sound sources are already present on the director's or producer's system, and a final audio mix is streamed to them for review in synchrony with the video.

The various components of the systems performing synchronized streaming media playback described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method comprising:
   establishing a data connection between a first multimedia system;
   designating the second multimedia system for synchronized media playback;
   at the second multimedia system:
      receiving via the data connection from the first multimedia system a stream of time-based media comprising a first plurality of samples representing a first time-based media track, wherein each sample of the first plurality of media samples is time-stamped with a presentation time defined as a temporal offset from a predetermined playback start time on the first multimedia system;

retrieving from storage on the second multimedia system a second time-based media track comprising a second plurality of samples, wherein each sample of the second plurality of samples is time-stamped with a presentation time defined as a temporal offset from a predetermined playback start time on the second multimedia system; and while continuing to perform the receiving and retrieving steps, playing back the first media track in synchrony with the second media track by playing the first plurality of samples and the second plurality of samples such that samples having the same presentation time are played simultaneously.

2. The method of claim 1, further comprising:

estimating a data transmission delay over the data connection; and wherein the synchronized playback on the second multimedia system is delayed with respect to playback on the first multimedia system by an interval of at least the estimated data transmission delay.

3. The method of claim 2, wherein a user of the first multimedia system initiates the synchronized playback, and the first multimedia system estimates the data transmission delay.

4. The method of claim 2, wherein a user of the second multimedia system initiates the synchronized playback on the second multimedia system, and the first multimedia system estimates the data transmission delay.

5. The method of claim 1, wherein at least one of the first and second multimedia systems includes time-based media editing capability.

6. The method of claim 1, wherein the playing back step is performed with a delay such that samples from the first multimedia system corresponding to a given presentation time have been received at the second multimedia system prior to playback at the second multimedia system of media corresponding to the given presentation time.

7. The method of claim 1, further comprising:

at the second multimedia system, receiving via a second data connection from a third multimedia system a third plurality of samples representing a third time-based media track, wherein each sample of the third plurality of media samples is time-stamped with a presentation time defined as a temporal offset from a predetermined playback start time on the third multimedia system;

playing back the third time-based media track in synchrony with the first and second time-based media tracks by playing the third plurality of samples such that samples of the third plurality of samples having the same presentation time as presentation times of the first and second plurality of samples are played simultaneously.

8. The method of claim 7, wherein playback at the second multimedia system is performed with a delay such that samples from the first and third multimedia systems corresponding to a given presentation time have been received at the second multimedia system prior to playback at the second multimedia system of media samples corresponding to the given presentation time.

9. The method of claim 7, further comprising:

estimating a first data transmission delay over the first-mentioned data connection;

estimating a second data transmission delay over the second data connection;

starting playback on each of the first and third multimedia systems in advance of starting playback on the second multimedia system such that media samples from the first and third multimedia systems are received by the second multimedia system prior to being required for playback at the second multimedia system.

10. The method of claim 7, wherein the second multimedia system includes a non-linear video editing system.

11. The method of claim 7, wherein at least one of the first and third multimedia systems includes a non-linear video editing system.

12. The method of 7, wherein at least one of the first and third multimedia systems includes a digital audio workstation.

13. The method of claim 7, wherein synchronized playback on the second multimedia system is initiated by a user of the first multimedia system.

14. The method of claim 7, wherein estimation of the first-mentioned and second data transmission delays is performed by the first multimedia system.

15. The method of claim 7, wherein synchronized playback on the second multimedia system is initiated by a user of second multimedia system and the second multimedia system performs the estimation of the first-mentioned and second data transmission delays.

16. A system comprising:

a memory for storing computer-readable instructions; and a processor connected to the memory, wherein the processor, when executing the computer-readable instructions, causes the system to perform a method of synchronized playback, the method comprising:

establishing a data connection between a first multimedia system;

designating the second multimedia system for synchronized media playback;

at the second multimedia system, simultaneously:

receiving via the data connection from the first multimedia system a stream of time-based media comprising a first plurality of samples representing a first time-based media track, wherein each sample of the first plurality of media samples is time-stamped with a presentation time defined as a temporal offset from a predetermined playback start time on the first multimedia system;

retrieving from storage on the second multimedia system a second time-based media track comprising a second plurality of samples, wherein each sample of the second plurality of samples is time-stamped with a presentation time defined as a temporal offset from a predetermined playback start time on the second multimedia system; and while continuing to perform the receiving and retrieving steps, playing back the first media track in synchrony with the second media track by playing the first plurality of samples and the second plurality of samples such that samples having the same presentation time are played simultaneously.

\* \* \* \* \*

UNITED STATES PATENT AND TRADEMARK OFFICE
CERTIFICATE OF CORRECTION

| | |
|---|---|
| PATENT NO. | : 9,653,117 B2 |
| APPLICATION NO. | : 14/013384 |
| DATED | : May 16, 2017 |
| INVENTOR(S) | : Robert M. Brown, Jr. |

Page 1 of 1

It is certified that error appears in the above-identified patent and that said Letters Patent is hereby corrected as shown below:

In the Claims

Claim 1, at Column 8, Lines 57-59:
Replace "A method comprising:
establishing a data connection between a first multimedia system;"
With --A method comprising:
establishing a data connection between a first multimedia system and a second multimedia system;--.

Claim 16, at Column 10, Lines 35-37:
Replace "the method comprising:
establishing a data connection between a first multimedia system;"
With --the method comprising:
establishing a data connection between a first multimedia system and a second multimedia system;--.

Signed and Sealed this
Eighteenth Day of December, 2018

Andrei Iancu
*Director of the United States Patent and Trademark Office*